United States Patent [19]
Georgopoulos et al.

[11] Patent Number: 5,450,657
[45] Date of Patent: Sep. 19, 1995

[54] SEAL

[75] Inventors: George Georgopoulos, Pine Brook; Richard C. Dreisbach, North Arlington, both of N.J.; Terrence N. Brammall; David L. Stevenson, both of Angola, Ind.

[73] Assignee: E. J. Brooks Company, Newark, N.J.

[21] Appl. No.: 221,589

[22] Filed: Apr. 6, 1994

Related U.S. Application Data

[63] Continuation-in-part of Ser. No. 65,471, May 21, 1993, abandoned.

[51] Int. Cl.⁶ ............................................. F16G 11/00
[52] U.S. Cl. ................................. 24/136 R; 24/115 M; 24/136 L; 403/369
[58] Field of Search ............ 24/136 R, 115 M, 136 L, 24/503; 403/366, 368, 369

[56] References Cited

U.S. PATENT DOCUMENTS

| | | | |
|---|---|---|---|
| 1,388,716 | 8/1921 | Hughes . | |
| 1,577,678 | 3/1926 | Behrman . | |
| 2,118,666 | 5/1938 | Dibner . | |
| 2,144,050 | 1/1939 | Fotsch . | |
| 2,148,173 | 2/1939 | Rogoff . | |
| 2,161,694 | 6/1939 | Becker . | |
| 2,294,398 | 9/1942 | Ferguson . | |
| 2,526,661 | 10/1950 | Hillery | 24/136 R |
| 2,665,331 | 1/1954 | Berndt | 403/368 |
| 2,988,727 | 6/1961 | Berndt . | |
| 3,205,300 | 9/1965 | Becker . | |
| 3,374,511 | 3/1968 | Barker | 403/369 |
| 3,524,228 | 8/1970 | Kelly | 403/369 |
| 3,852,850 | 12/1974 | Filhaber . | |
| 3,868,748 | 3/1975 | Kelly . | |
| 3,879,147 | 4/1975 | Morell | 24/115 M |
| 3,994,521 | 11/1976 | Van Gompel . | |
| 4,333,649 | 6/1982 | Vaughn et al. | 24/115 M |
| 4,756,063 | 7/1988 | Nehling et al. | 28/269 |
| 5,222,776 | 6/1993 | Georgopoulos et al. . | |

FOREIGN PATENT DOCUMENTS

WO86/02705 5/1986 WIPO .

*Primary Examiner*—Victor N. Sakran
*Attorney, Agent, or Firm*—William Squire

[57] ABSTRACT

A stamped hardened sheet steel tapered ferrule with cantilevered radially resilient fingers is wedged by a spring against a tapered bore of a hardened steel housing. The fingers bend radially inwardly to grip a stranded steel cable in the ferrule bore in response to the spring action. When the cable is slid in the ferrule in one direction, the ferrule gripping the cable is further wedged against the tapered bore and further grips the cable. The cable is released when it is slid in the opposite direction pulling the engaged ferrule away from the tapered bore of the housing. The cable has a flag at one end which with the seal lock a hasp therebetween limiting the relative motion of the cable in the opposite ferrule release direction. In a second embodiment, the ferrule is in interference fit with a rod or cable and the spring is not used forcing the ferrule to always grip the rod or cable. The ferrule in both embodiments grips the softer cable with higher rotational force than the ferrule friction force with the housing bore so that rotation or twisting of the cable relative to the housing rotates the ferrule therewith. The cable can not be threaded out of the ferrule by rotating the cable. A lubricant or reduced friction material coating can be used to enhance relative rotation between the ferrule and housing.

24 Claims, 2 Drawing Sheets

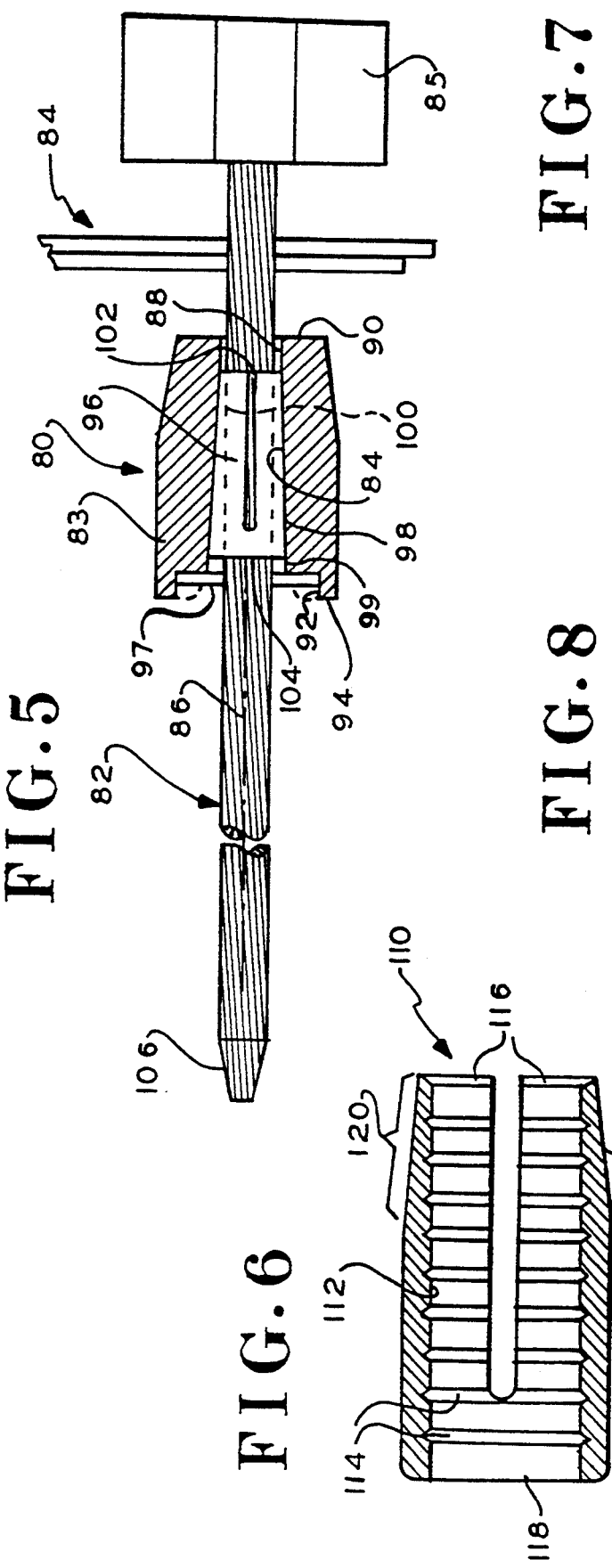
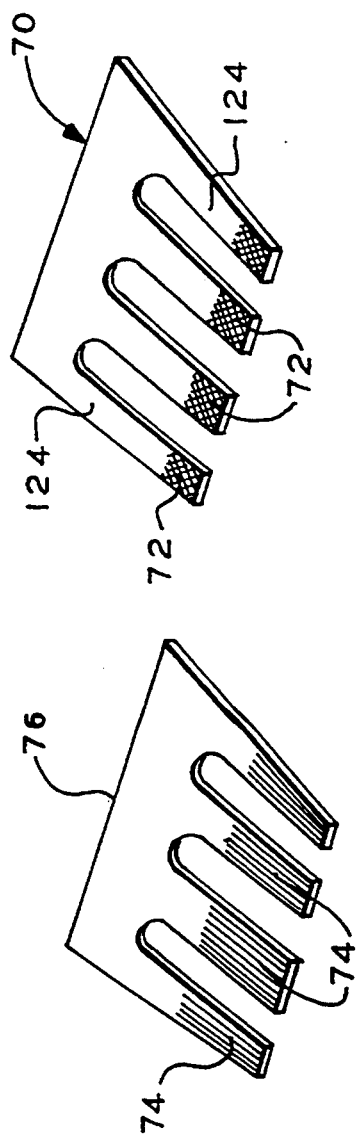

SEAL

This application is a continuation-in-part of application Ser. No. 08/065,471 filed May 21, 1993, abandoned.

FIELD OF THE INVENTION

This invention relates to reusable seals for locking a cable thereto.

Of interest is commonly owned copending U.S. patent application Ser. No. 106,428 entitled "Reusable Seal for use with Rod" filed Aug. 13, 1993 in the name of Georgopoulos et al.

BACKGROUND OF THE INVENTION

Cable gripping devices are in wide use and comprise a self-adjusting cable gripping unit which automatically adapts itself to gripping a stranded cable. In seal use, a cable is formed with a swaged flag at one end to form an integral head member for the cable end. The other end of the cable is free. The cable free end is slipped or otherwise passed through an opening of a structure to be locked, for example, two hasps of a lock arrangement or other arrangement in doors, walls and the like for securing two elements together.

After the cable is slipped through the hasps or other lock arrangement, the cable gripping unit receives the free end of the cable and the cable is slid through the unit which has a bore therein including a cable gripping structure within the bore which slides over the cable as the unit is slid along the cable. When the unit reaches a desirable position adjacent to the hasp or other structure to which the cable is to be locked the unit is left in place at that location. Any attempt to remove the unit by sliding the unit in a reverse direction along the cable is precluded by a gripping structure within the unit bore. If the gripping structure is attempted to be slid in the reverse direction, it wedges against the cable and locks thereto. The gripping unit housing and the flag at opposing ends of the cable lock the cable and the hasp together.

In U.S. Pat. No. 3,852,850, a cable gripping unit is disclosed. This unit includes a helical spring, a cable receiving cup and a gripping member comprising a jaw retaining member and jaw segments. A shell formed of metal has a bore terminating in a cable accommodating opening and a cylindrical portion terminating in a reduced diameter opening proving an inwardly projecting annular shoulder. The gripping member and jaw segments are received in the bore. The gripping member is urged toward a reduced end of the opening of the gripping unit shell. The jaw retaining member is formed of an elastic material with the jaw segments held in slots in the retaining member. A spring urges the jaw segments in wedging engagement in the shell bore. This structure requires a number of different elements including separate jaw segments and a jaw retaining member.

U.S. Pat. No. 3,868,748 ('748) discloses a tendon gripping and release assembly somewhat similar to that disclosed in U.S. Pat. No. 3,852,850. In the '748 patent, a tapering casing housing includes spring compressed wedge segments arranged to form a bore therebetween for reception and retention of a steel tendon inserted in the casing. The wedged segments are urged towards the small end of the tapering casing by a spring. An elongated release member extends transversely through the small end of the tapered casing and engages one end of the wedge segments. The release member urges the wedged segments rearwardly against the tension of a spring to release the grip on the tendon and permit removal thereof from the assembly.

In those instances where it is not desirable to release the tendon, the use of a release mechanism as disclosed in this patent is not desirable. For example, where it is desired to permanently lock to the tendon, a release mechanism is not needed.

In U.S. Pat. No. 3,994,521, a portable cable lock is employed with a ball detent mechanism. The balls provide similar action as that of the wedge segments in the patents discussed above. In this arrangement, a locking shell is formed with a central passageway which is internally tapered with an opening that changes from conical to triangular and which carries spring loaded ball bearings and a retainer such that a cable can be inserted through the central opening in a first direction. This depresses the spring and allows the balls to relieve pressure on the cable in the first direction but which provide substantial locking pressure on the cable when the cable is placed under tension in the opposite direction.

A still further arrangement is disclosed in U.S. Pat. No. 1,577,678 which discloses a fastening means employing a similar type of cable gripping structure. U.S. Pat. No. 899,776 discloses a trolley wire splicer employing a number of jaws. This arrangement is somewhat similar to that disclosed in the U.S. Pat. No. 3,852,850 discussed above.

A common problem with the above recognized by the present inventors is the possibility of the cable twisting relative to the gripping or locking devices within the locking assembly housing. When a stranded cable twists relative to the gripping members inside the housing, the helix of the strands acts as a thread such that the cable may be twisted out of engagement with the gripping or locking devices. This is a problem with seals as disclosed, for example in the '521 patent above, because the cables are short and can be manually twisted.

This is not a problem with many of the prior art because the cables are not twistable relative to the locking assembly. For example, in U.S. Pat. No. 2,988,727 the cables are used in transmission work, mechanical apparatus and structural work. As a further example, in U.S. Pat. No. 3,374,511 to Barker the cables are used in pre-stressed concrete structures. Cables in guy wires, concrete, transmission lines and other typical structural uses are not normally twisted in use.

In commonly owned U.S. Pat. No. 5,222,776 a security seal is disclosed which uses balls for wedging and locking a cable. Here the problem of twisting is recognized in this type of seal and is dealt with in the disclosed arrangement. However, it is not generally known in jaw type locking devices such as in Barker, that cable twisting is a problem because the locking jaws are different than the ball structure and the cables normally used therewith in the prior art do not twist.

The prior art discussed above utilize a spring for urging the gripping member in engagement with the cable or tendon. This is costly as the housing or casing needs to be elongated to accommodate the spring and these represent additional cost.

The present inventors recognize a need for a low cost simplified cable locking seal for securing a cable thereto which is not subject to the twisting release action of stranded cables. The present inventors also recognize a need for a low cost seal that does not utilize a spring to be operative.

SUMMARY OF THE INVENTION

A device for locking a cylindrical element, such as a twisted stranded cable or rod, according to the present invention, comprises a housing having a longitudinally extending bore therethrough for receiving the element. The bore has a tapered portion forming a frustro-conical surface of revolution having a distal end and a relatively wider proximal end. A hollow member is included having distal and proximal ends, the frustro-conical portion being dimensioned to be received in the tapered portion in a first direction toward the surface distal end for wedging the member distal end against the frustro-conical surface. The member comprises a plurality of resilient fingers extending between the member proximal end toward the distal end and forming a bore. The fingers at their distal end bend radially inwardly in response to wedging of the member in the tapered bore, the member bore for receiving the element therethrough. Means cause the fingers to grip the element in interference fit to radially compress the element. The fingers lock the element to the housing in response to the element being axially displaced through the bore in the first direction and release the element in response to the element being axially displaced in a direction opposite the first direction.

In a further embodiment, with a stranded cable, means are provided for causing the member to rotate with the cable relative to the housing when the cable is rotated relative to the housing.

In accordance with a further embodiment the cable has an outer diameter and the fingers at the distal end in a quiescent cable unengaged state define an internal diameter smaller than the cable outer diameter.

In accordance with a still further embodiment, the means for causing comprises means for providing a circumferential gripping force between the member and the cable higher than a concentric circumferential gripping force between the member and the housing whereby the member rotates with the cable relative to the housing when the cable is rotated.

In a further embodiment employing a rod, the rod and gripping member each having engaged irregular surfaces, such as grooves or knurls, to enhance the gripping of the rod by the gripping member.

IN THE DRAWING

FIG. 5 is a side elevation sectional view of a device in accordance with a second embodiment of the present invention;

FIG. 6 is a more detailed sectional elevation view of a further embodiment of a member useful in the embodiment of FIG. 5; and FIG. 7 and 8 are alterative embodiments of the member of FIG. 3.

DESCRIPTION OF THE PREFERRED EMBODIMENT

Figure 1:
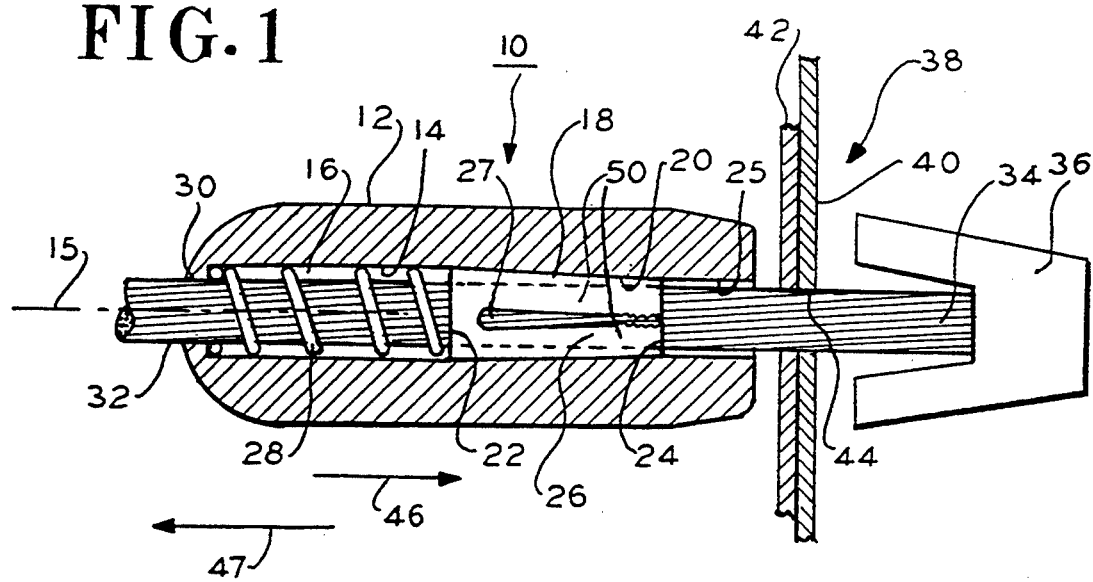
FIG. 1 is a side elevation sectional view of a device in accordance with one embodiment of the present invention.

In FIG. 1, device 10 comprises a hardened heat treated steel casing 12 having a longitudinal bore 14 on axis 15. Bore 14 has a circular cylindrical portion 16 and a tapered conical portion 18 which is formed as a frustro-conical surface of revolution. Portion 18 has a frustro-conical surface 20 which has a larger diameter 22 which extends from portion 16 and tapers to a narrower diameter 24 at an end thereof distal the portion 16. Bore 14 includes a circular cylindrical portion 25 of about the same diameter as end 24 and open at the casing 12 end.

A hardened heat treated preferably steel frustro-conical collet or ferrule gripping member 26 is in portion 18 and abuts the frustro-conical surface 20 between cylindrical portion 16 and cylindrical portion 25. The member 26 preferably is about as hard as the casing 12 for purposes to be explained below. A coiled compression spring 28 is in bore 14 between the gripping member 26 and swaged end 30 of the casing 12.

The end 30 of bore 14 is swaged to a reduced diameter to lock the spring 28 in the bore 14 after the member 26 and spring 28 are inserted in the bore 14. The swaged end 30 reduced diameter of bore 14 precludes removing the spring 28 and the member 26 from the bore 14.

A stranded steel cable 32 has a free end (not shown) which extends to the left of the drawing. The other end 34 has a flag 36 swaged thereto. The flag 36 is a metal head which when attached to the cable 34 end is locked to the cable and cannot be removed therefrom. The flag 36 is larger than the bore 14 so it cannot pass through the bore 14. A hasp arrangement 38 comprises two hasps 40 and 42 with an aperture 44. The aperture 44 closely receives the cable 32 therethrough but cannot pass the flag 36 or the casing 12 therethrough.

The free end of the cable opposite the flag 36 is passed through the aperture 44 of the hasps 40 and 42 of the arrangement 38 and then slid through the bore 14 of the casing 12. The cable 32 is also passed through the bore of the member 26, through the core of the spring 28 and then through the opposite end of the casing 12 through the opening at the end 30.

Figure 2:
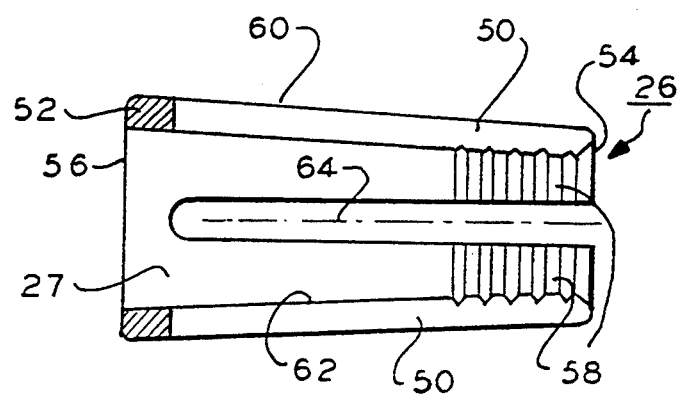
FIG. 2 is an enlarged more detailed sectional elevation view of the locking member employed in the embodiment of FIG. 1.
Figure 4:
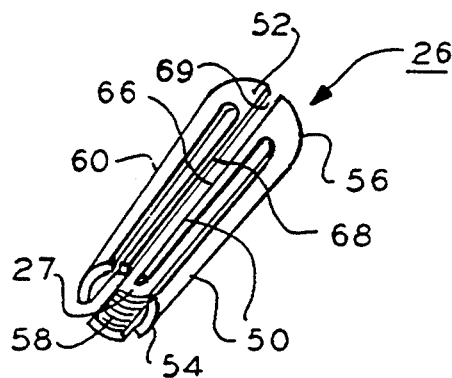
FIG. 4 is an isometric view of the member employed in the embodiment of FIG. 1 after stamping of the member of FIG. 3.
Figure 3:
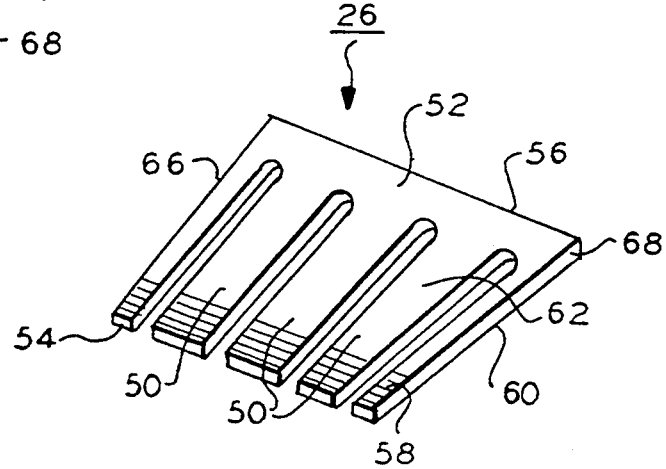
FIG. 3 is an isometric view of the member of FIG. 2 prior to being formed from the flat sheet member shown.

In FIGS. 2, 3 and 4 the gripping member 26 comprises a stamped sheet metal collet or ferrule having a plurality, four in this embodiment, of cantilevered fingers 50 which form bore 27 and which cantilever from end portion 52 of the member 26 along axis 64. The member 26 at the opposite end 54 is of smaller diameter than the end 56 at portion 52. The end 54 smallest bore diameter of member 26 at surface 62 is about the same size as the outer diameter of the cable 32. This permits the cable 32 to be easily inserted through the member 26 with low insertion force. The member 26 has an external surface 60 which is frustro-conical to mate with and engage the frustro-conical surface 20 of the bore 14 of casing 12.

Each of the fingers 50 has an array of parallel curved groove segments 58. The segments 58 and the fingers are in an annular array, FIG. 2. The segments 58 correspond to a particular outer diameter stranded cable, for example ¼ inch diameter cable. The strand diameters of different diameter cables differ and therefore affect the gripping action of the member 26. For other cable sizes, e.g, smaller diameter cables, the groove segments are not used and a knurled configuration 72 in member 70, FIG. 7, or longitudinal grooves 74 in member 76, FIG. 8 are preferable to provide optimum gripping of the cable for the purpose described below.

Both the external surface 60 of the member 26 and the interior surface 62 taper relative to the longitudinal axis 64 of the member 26 and are both frustro-conical. The smallest diameter of the bore 27 adjacent to end 54 is sufficiently large to receive the cable 32, FIG. 1, therethrough. This diameter may be in interference fit with the cable 32 as described below in connection with the embodiment of FIG. 5, but is not essential in this embodiment. The portion 52 at end 56 is somewhat larger than the cable 32 diameter. The fingers 50 are radially resilient and can bend radially inwardly toward axis 64. This bending is in response to a inwardly directed force on surface 60, such as created when member 26 is wedged against surface 20 when forced in direction 46 by spring 28.

The member 26, FIG. 3, is formed into a frustro-conical shape, FIG. 4, from flat sheet metal stock, The edges 66 and 68 of the member 26 are spaced, FIG. 4, to form a gap 69. This gap permits the member 26 along its length to bend radially inwardly about the member longitudinal axis reducing the outer conical diameter.

The larger end 56 of the member 26 has a sufficiently large external diameter so that the spring 28 abuts there against in the assembled state, FIG. 1. The spring 28 normally urges the narrow tapered end 54 of the member 26 in wedging relationship with the tapered portion 20 of the casing 12 bore 14.

In operation, the cable free end to the left of the drawing in FIG. 1 is inserted through the bore 14 of casing 12 and through the bore 27 of the member 26, direction 47. The spring 28 normally urges member 26 in direction 46 wedging the member 26 against the tapered surface 20. This causes the member 26 fingers 50 to normally radially squeeze together and engage the cable. Only the cantilevered ends of the fingers 50 at end 54 engage the cable due to the taper of the member 26 providing a biting action. As the cable is slid to the left in the drawing in direction 47 through the member 26, the fingers 50 gripping the cable cause the member to move to the left direction 47 away from surface 20. This places the fingers 50 in the larger bore diameter portion of bore 14. As a result, the fingers resiliently return to their quiescent state displacing radially apart to permit the cable to slide therethrough. In case of interference fit, the force of the cable in direction 47 also forces the fingers apart.

However, should the cable 32 be slid in the opposite direction 46, the spring 28 forces member 26 in direction 46. The ridges of groove segments 58 of the member 26, FIG. 2, (or knurls 72 of FIG. 7 or grooves 74, FIG. 8, of member 76) grip the cable 32 external surface due to the wedging action causing the member 26 to be further pulled with the cable in direction 46. The size of the grooves of segments 58 and their spacing is determined by the particular cable strand configuration and size to be used therewith to obtain optimum gripping action. The pulling action of the cable forces the member 26 to further wedge into the tapered portion 20 of the casing 12 bore 14 against cable 32. The greater the force that is exerted on the cable 32 in the direction 46, the greater the wedging action of the member 26 in the bore 14. Thus, once the casing 12 is slipped onto the cable 32 and assembled to a given location in direction 46 relative to each other, the casing 12 cannot be removed from the cable in an opposite direction 47 because of the wedging action of the member 26.

The groove segments 58, FIG. 2, knurls 72, FIG. 7 or grooves 74, FIG. 8, also serve an additional important function. The gripping action of the cable 32 by the member 26, for example, has a relatively high circumferential force about axis 15 with respect to that between the member 26 outer surface 60 and the inner surface 20 of bore 14. Any twisting or rotation of the cable relative to the casing 12 twists or rotates the member 26 also relative to the casing 12. This relative rotating action of member 26 is important because the helical wound strands of a twisted cable act as threads of a screw and any relative twisting of the cable to the member 26 will "thread" the cable out of the member 26 and defeat the seal. Therefore, it is important that no relative rotation of the cable to the member 26 occur when the cable is rotated.

This gripping action is enhanced by several factors. One is the relative shape of the grooves in the member 26 as shown in FIGS. 2, 7 and 8. For certain cables, For example, the axial grooves 74, FIG. 8, provide optimum annular circumferential gripping of the member to the cable about axis 15 because in such cables the lay of the strands is also axial. The ridges enter the roots between the strands and provide resistance to relative rotation of the cable to the member about axis 15. In other cables, the knurls of FIG. 7 provide enhanced biting of the cable as compared to the other groove types. For use with a ¼ inch 7×19 cable (7 bundles of 19 strands each), the grooves of FIG. 2 are preferred. Knurls are preferred for a 1×19 cable. Further, fine grooves are needed to snag the fine wires of a 1×19 cable. Smaller cables may require other groove configurations. A knurled collet member has a lower cable axial pulling power whereas circumferential grooves have a higher pulling power on the cable.

A second factor is the relative hardness of the member 26 to the cable and to the casing 12. The member 26 and casing 12 both are hardened heat treated steel and exhibit relatively low friction therebetween as between the member 26 and the softer cable, the member 26 being harder than the typical stranded cable. Thus, the member 26 readily bites into the cable strands at the smaller diameter end 54. If there is any wear between the two, the cable wears first. This is acceptable because the cable is an expendable and if cut by such action is evidence of tampering which is an important part of the seal design. Any cut cable is obvious tamper evidence.

A third factor is the relative friction between the member 26 and the casing 12 bore 14 surface. This friction should be sufficiently low so that the gripping forces between the member 26 and the cable in the circumferential direction about axis 15 created at least by spring 28 axial wedging action are greater than that between the comparably relatively hard member 26 and casing 12. The mating casing 12 surface 20 and member 26 surface 60 are also made relatively smooth and exhibit low friction therebetween. Because both the member 26 and the casing 12 are hardened steel, the friction therebetween is relatively lower than when one is softer than the other. Prior art casings generally are not hardened steel.

To enhance low friction between the casing 12 and member 26, a lubricant may be added to the interface between member 26 and casing 12. For example, zinc dichromate may be plated on the bore 14 surface including surface 20 to provide such a lubricant. Other substances such as lithium, grease or a Teflon coating on the bore 14 surface or member 26 outer surface 60 may also be used.

After the cable 32 is secured to and locked to the device 10 about the hasp arrangement 38, the flag 36 and the casing 12 being both larger than the aperture 44 of the hasp arrangement, lock the hasp arrangement 38. The cable 32 is cut at an appropriate location preferably between the flag 36 and the hasp arrangement 38 to remove the cable from the device 10. Once the flag 36 is removed, the cable 32 end 34 is slid through the device 10 in the direction 47. Once the cable is removed, a new cable and flag assembly can be attached to the device 10 including the undamaged casing 12 and member 26 which are reusable. The relatively hard casing and member 26 also preclude significant wear thereof in use.

In FIG. 5, a seal device 80 and a stranded cable 82 having a flag 85 at one end seal hasp arrangement 84. Device 80 comprises a hardened steel casing 83, a hardened steel collet or ferrule cable gripping member 96 and a washer 97. The end 94 of the casing is rolled over as shown in phantom to seal the washer in place and thus the member 96 in the casing 83 bore 84. Casing 83 has a frustro-conical bore 84 which extends for the majority of the length of the casing along axis 86. The bore 84 has a circular cylindrical portion 88 in communication with end 90, a second circular cylindrical bore 99 in communication with end 94 and an enlarged cylindrical bore 92 at casing end 94, which bore 92 receives the washer 97. Gripping member is frustro-conical on its external surface 98 and its bore internal surface 100, the internal and external surfaces being concentric for the axial length of the member 96.

The member 96 is similar in isometric view as member 26 FIG. 4 such that the fingers of member 96 are radially resilient at end 102, being cantilevered from the member at annular end 104. Member 96 at end 102 is in interference fit with the cable 82. Also, member 96 is relatively stiff radially so as to grip the cable 82 without a spring, such as spring 28 of FIG. 1. To effect such gripping, the interference fit automatically causes the fingers of member 96 to tightly grip the relatively softer cable. Only the end 102 of member 96 is in interference fit with the cable so as to bite the cable at this end. The remaining portion of the member 96 has a larger internal diameter bore 100 than the maximum external diameter of the cable. Thus the end 102 regions of the fingers of member 96 in their normal quiescent state bite into the material of the cable to form a grip therewith while the other end 104 is not in interference fit. This interference fit of member 96 with the cable 82 is sufficient to lock the member 96 axially and rotationally relative to the cable 82 should the cable be rotated about axis 86 or pulled to the right in FIG. 5.

When the cable is slid to the left of the drawing FIG., it pulls the member 96 therewith. The bore 84 of casing 83 has a length along axis 86 greater than that of the member 96 so that member 96 can be pulled to the left in the Figure relative to the casing 83. When at the left most position, the casing bore 84 is sufficiently large so that the cable pulling forces to the left forces the fingers apart sufficiently for the cable to slide to the left relative to the member 96.

The interference fit for a ¼ inch diameter steel stranded cable is preferably in the range of 0.020 to 0.040 inches in accordance with the cable hardness. The member 96 is preferably heat treated CR 1040-1050 steel or other alloys with similar spring-like properties. Other steels may be too soft or too hard and brittle. The fingers of member 96 are sufficiently flexible to bend when desired during gripping. Member 96 preferably is approximately 0.050 inches thick stamped sheet steel and may be other thicknesses.

The cable 82 has a tapered leading end 106 to facilitate insertion of the cable through the member 96. The strands of end 106 are fused by heating and the taper is then ground. The amount of interference fit between the cable and the member 96 determines the insertion force among other factors such as hardness of the different elements. The insertion force may be relatively high relative to the embodiment of FIG. 1, but this is acceptable. The insertion force should be reasonable so as to permit manual insertion of the cable into the device 80.

The casing 80 is made relatively short by eliminating the spring 28 of FIG. 1 and thus is lighter and less costly to fabricate. Fewer components reduce the cost of the assembly.

In FIG. 6, an alternate embodiment for the collet member is shown. Collet member 110 has a cylindrical bore 112 with an array of parallel annular grooves 114. Bore 112 is in interference fit with the cable along the bore 112 length. The interference fit may be less than that of the embodiment of FIG. 5 to reduce the insertion force of the cable into the bore 112. A plurality of fingers 116 depend from annular end 118. The fingers at end 116 are radially resilient relative to end 118. The external surface 122 of the member 118 comprises a tapered frustro-conical region 120 adjacent to end 116. The remaining external surface of the member 110 is circular cylindrical which mates with a similar hardened surface formed in the bore of the mating casing. In this case, the circular cylindrical bore of the casing is axially longer than the portion 99 of casing 80, FIG. 5. The tapered external surface 122 at region 120 mates with the tapered bore of the casing 83, FIG. 5. This jams by wedging action the fingers 116 radially inwardly when the member 110 is pulled to the right when assembled to the casing of FIG. 5. When so jammed, the internal member 110 bore at end 116 bites further into the cable. The interference fit of the member 110 to the cable causes the member 110 to rotate if the cable is also rotated relative to the casing. The amount of interference fit is determined for each cable and member assembly to permit reasonable insertion forces while still providing relatively high friction between the member and the cable and low friction between the member and the casing. In each implementation of the devices 10 of FIG. 1 and 80 of FIG. 5, the member and cable are configured to provide optimum operating factors as discussed above including the relative friction therebetween at their mating surfaces.

In FIGS. 7 and 8, the respective collet members 70 and 76 have three cantilevered fingers rather than four as shown in FIG. 4, the members in FIGS. 7 and 8 being shown in blank form prior to stamping. After stamping, the end finger portions 124 in FIG. 7 join together to form a single finger as illustrated in FIG. 4 for member 26 to form a frustro-conical bore and external surface on members 70 and 76. The end finger portions of FIG. 8 join to form a single finger after stamping. Because there are fewer fingers in FIGS. 7 and 8 embodiments, these tend to be stiffer at their cantilevered ends than the embodiment of FIG. 4 with four fingers for the same material.

While particular embodiments of the present invention have been described, it should be understood that it is intended that modifications may be made to the disclosed embodiments and that the scope of the invention is as defined in the appended claims. For example, in a further implementation, a rigid rod may be used in place of the stranded cable. In this case, the rod has a rough surface which may comprise annular grooves or knurls or other configurations to assist the gripping member such as members 26 or 110 in grasping the rod surface. The rod is preferably grasped with the gripping member in interference fit at all times to pull the gripping member with the rod in response to axial displacement of the rod in either direction. The term cylinder in the claims includes both rigid rods and flexible cables. In the case of rods with circular annular grooves, the gripping member does not thread out of the casing and thus the problem with stranded cables is not present. Therefore, with rods, the gripping member preferably, but need not rotate relative to the casing.

What is claimed is:

1. A device for locking a twisted stranded cable thereto comprising:
- a housing having a longitudinally extending bore therethrough for receiving said cable, said bore having a tapered portion forming a frustro-conical surface of revolution having a distal end and a relatively wider proximal end; and
- a hollow member having distal and proximal ends and dimensioned to be received in said tapered portion in a first direction toward said surface distal end for wedging against said frustro-conical surface, said member comprising a plurality of resilient fingers cantilevered from the member proximal end, said fingers bending radially inwardly in response to wedging of the member in said tapered bore in said first direction, said member for receiving said cable therethrough;
- said fingers forming a bore dimensioned to receive the cable in interference fit therewith to radially compressively grip the cable so that the member displaces with the cable in response to displacement of the cable and the fingers lock to the cable and housing in wedged relation in response to the cable being axially displaced through said housing bore in the first direction and release the cable in response to the cable being axially displaced in a direction opposite the first direction.

2. The device of claim 1 wherein said cable has an outer diameter, said fingers at least at the distal end in a quiescent cable unengaged state having an internal diameter smaller than the cable outer diameter.

3. The device of claim 1 wherein the fingers have an internal cable gripping surface with circumferential grooves at least at said distal end.

4. The device of claim 1 wherein the fingers have an internal knurled cable gripping surface at least at said distal end.

5. The device of claim 1 wherein the fingers have an internal cable gripping surface with axially extending grooves at least at said distal end.

6. The device of claim 1 wherein the member has a bore a portion of which is formed by said fingers and which receives said cable, said fingers in said bore portion each having a plurality of ridges adjacent to the distal end of the member.

7. The device of claim 1 including means for causing the member to rotate with rotation of the cable relative to the housing by providing a circumferential gripping force between the member and the cable higher than a concentric circumferential gripping force between the member and the housing.

8. The device of claim 7 wherein the means for causing the member to rotate includes lubricant means for reducing the friction between the housing and said member.

9. The device of claim 7 wherein the means for causing the member to rotate includes providing the interface of the housing bore and the member with reduced friction value relative to the value of the friction between the cable and the member.

10. The device of claim 1 wherein the member is formed of heat treated steel.

11. The device of claim 1 wherein the housing is hardened heat treated steel.

12. The device of claim 1 wherein the member and housing are both hardened heat treated steel of about the same hardness.

13. A device for locking a twisted stranded cable thereto comprising:
- a housing having a longitudinally extending bore for axially receiving said cable therethrough, said bore having a tapered surface portion;
- a hollow member having at least a frustro-conical peripheral surface portion dimensioned to mate with and be received in said bore in a first direction toward said bore tapered surface for wedging against the tapered surface, said member having a bore and comprising a plurality of resilient fingers cantilevered from one member end toward a second member end of smaller external diameter than the one member end, said fingers bending radially inwardly in response to a radially inwardly directed force caused by wedging of the member to said tapered bore surface in said first direction, said member bore for receiving said cable therethrough; and
- means arranged so that said fingers radially compressively resiliently grip the cable thereto such that said member is pulled by the cable in response to the cable being displaced through said housing bore in the first direction and in a second direction opposite the first direction, said member locking to the cable and housing when wedged in the first direction and resiliently releasing the cable in response to the cable being displaced in the second direction while simultaneously causing the member to rotate with the cable in said housing bore relative to said housing in response to rotation of said cable gripped by said member.

14. The device of claim 13 wherein the means arranged include dimensioning the fingers to be in interference fit with said cable in said bore.

15. The device of claim 13 wherein the housing bore has a longitudinal axis and wherein the means arranged comprises forming the housing, member and cable so that the forces between the housing and member is lower than the forces between the member and the cable in a rotational direction lying in a plane normal to said first direction.

16. The device of claim 13 wherein said means arranged comprises forming the second member end with an internal diameter smaller than the outer diameter of the cable.

17. The device of claim 13 wherein the housing and member are both hardened heat treated steel of about the same hardness.

18. A device for locking a cylindrical member thereto comprising:
- a housing having a longitudinally extending bore therethrough for receiving said cylindrical member, said bore having a tapered portion forming a surface of revolution having a distal end and a relatively wider proximal end; and
- a hollow gripping member having distal and proximal ends, said hollow gripping member being dimensioned to be received in said tapered portion in a first direction toward said surface distal end for wedging the hollow gripping member distal end against said tapered portion surface, said hollow gripping member comprising a plurality of radially resilient fingers extending between the member proximal and distal ends and forming a bore, said fingers bending radially inwardly in response to wedging of the member in said tapered bore, said hollow gripping member bore for receiving said cylindrical member therethrough;
- said fingers being dimensioned relative to the cylindrical member to compressively and radially grip the cylindrical member for displacing with the cylindrical member as the cylindrical member is axially displaced through said housing bore in the first direction and in a second direction opposite the first direction to thereby wedge and lock the gripping member to the housing and cylindrical member when the cylindrical member is displaced in the first direction and release the cylindrical member when the cylindrical member is displaced in the second direction.

19. The device of claim 18 wherein said member distal end is in interference fit with said cylindrical member.

20. The device of claim 18 wherein the member bore is frustro-conical.

21. A device for locking a circular cylinder thereto comprising:
- a housing having a longitudinally extending bore therethrough for receiving said cylinder, said bore having a tapered portion forming a surface of revolution having a distal end and a relatively wider proximal end; and
- a hollow member having distal and proximal ends and dimensioned to be received in said housing bore and displaceable in the bore in a first direction toward said surface distal end for wedging against said tapered portion surface, said member comprising a plurality of resilient fingers extending between said hollow member ends, said fingers bending radially inwardly in response to wedging of the hollow member in said tapered bore when displaced in said first direction, said hollow member for receiving said cylinder therethrough;
- said fingers being dimensioned to radially grip the cylinder in interference fit, the hollow member in response to the cylinder being axially displaced through said bore in the first direction displacing with the cylinder and locking the cylinder and housing thereto when wedged and displacing with and releasing the cylinder in response to the cylinder being axially displaced in a direction opposite the first direction.

22. The device of claim 21 including an irregular surface on at least said fingers in a region engaging the cylinder.

23. The device of claim 22 including the cylinder, said cylinder further having an irregular outer surface.

24. The device of claim 23 wherein the irregular surface on the cylinder includes one of knurls and grooves.

* * * * *